March 31, 1964  G. RUPPRECHT  3,127,513

PYROGRAPHITE POLARIZER

Filed Jan. 30, 1961

INVENTOR
GEORG RUPPRECHT
BY Herbert W. Arnold
ATTORNEY

United States Patent Office 3,127,513
Patented Mar. 31, 1964

3,127,513
PYROGRAPHITE POLARIZER
Georg Rupprecht, West Newton, Mass., assignor to Raytheon Company, Lexington, Mass., a corporation of Delaware
Filed Jan. 30, 1961, Ser. No. 85,764
18 Claims. (Cl. 250—86)

This invention relates to polarization devices for electromagnetic radiation and more particularly to polarization devices capable of polarization of electromagnetic radiation over a wide band of frequencies extending from infrared light to radio-frequency waves.

A long standing problem has been to provide a means for polarizing radiation over a wide band of frequencies from infrared to radio frequencies for the provision of devices utilizing polarized radiation and measurement techniques associated with such radiation. In addition, the problem of providing polarized radiation in the far infrared region has been an old one and has resulted in a gap in the frequency spectrum in which no polarized radiation in the far infrared region is available either for the transmission of such radiation or for its use in radiation measurement and other techniques.

Numerous polarization devices and techniques have been used to provide polarized radiation, including polarized infrared radiation. For example, polarization of light by reflection at the Brewster angle has been achieved. Here the incident wave propagated at a particular incidence angle known as the Brewster angle with relation to a reflective material produces only a single component in the reflected wave, the other component of such radiation being directed into the reflective material. In this device, optical structure is required to direct parallel radiation to the surface of the reflective material precisely at the Brewster angle. Such structure is difficult to align and is accompanied by reflective losses not present in a direct-transmission-type polarizer.

Alternately, a metal screen constructed of closely spaced parallel wires and used to polarize electromagnetic energy at radio frequencies is unsuited to wavelengths extending into the far infrared and infrared regions. The thickness and spacing of the polarizing medium reflects the energy directed toward such medium since it is substantially impossible to provide wires of sufficient thinness to propagate such energy and it is necessary to space the wires a distance apart in the wavelength. In addition, dielectric foils, constructed of material such as polyester, polyvinyl or other organic materials, result in pronounced absorption of radiation passing therethrough, and, therefore, propagate radiation unevenly and over only limited ranges of the infrared spectrum. This absorption is due to the particular lattice structure of such materials in which infrared radiation introduces vibrations in such lattice structure. Lattice vibrations are accompanied by absorption frequency bands which prevent propagation by reflection and absorption. On the other hand, inorganic materials, such as silver chloride, turmalin and the like, transmit radiation in limited spectral ranges. However, such materials do not possess structural and electrical properties sufficient for polarization of such radiation in the far infrared region. Thus, no materials have heretofore been identified which offer a solution to the problem of providing polarized radiation in the far infrared region and which propagate electromagnetic energy substantially uniformly over the spectrum from infrared waves to radio frequency waves.

It is, accordingly, a primary object of the present invention to provide a polarization device which produces polarized radiation in the far infrared region, and, in addition, over a wide band of frequencies from approximately four microns to radio frequencies without the aforementioned gap in the infrared spectrum.

It is a further object of the invention to provide polarized radiation in the infrared region and far infrared region by a simple device which does not require accurately projected rays of parallel radiation.

It is also an object of the invention to provide a device which produces a higher degree of polarization than heretofore obtainable in the infrared and far infrared regions.

In accordance with the present invention, the above and other objects are achieved by means of a foil or thin sheet for polarizing radiation which comprises pyrolytically formed graphite. The pyrolytic graphite provides a high anisotropy of electrical and structural properties which causes an anisotropy of radiation absorption which results in polarization of incident electromagnetic radiation. The foil comprising such pyrographite material is cut sufficiently thin to propagate a substantial percentage of incident radiation and is oriented so that the plane exposed to the incident radiation contains both the crystallographic $c$ axis in which energy is propagated and the $a$ axis, orthogonal to the $c$ axis, lying in the basal plane in which energy is absorbed. More particularly, the foil is oriented so that the direction of minimum attenuation of radiation, that is in the crystallographic $c$ axis, extends in the foil in a direction substantially perpendicular to the propagation direction of the electromagnetic radiation. Oriented in this maner, the pronounced electrical and structural anisotropy of pyrolytically formed graphite provides polarized radiation in the far infrared region, heretofore unobtainable, as well as polarization of radiation substantially uniformly in a frequency band extending from infrared to radio frequency waves.

In achieving this new and unobvious result, the present invention utilizes concepts which offered no practical solution to prior workers in the art. For example, the high antisotropy of the thermal and direct current electrical conductivity of pyrographite, as is presently known, provides an adequate description of the properties of pyrographite in the microwave region. However, the optical properties of pyrographite in the infrared region are not necessarily determined solely by its thermal and direct current electrical anisotropy. The reason for this is that at optical frequencies, the lattice structure of pyrographite, like other known materials, would be expected to exhibit optically active lattice vibrations which would absorb a substantial proportion of the energy of the incident optical radiation. It has been determined, however, that, in an unexpected manner, due to the particular ordering of the formation of the pyrographite crystalline structure during the pyrolytic deposition, the resulting pyrographite lattice is sufficiently damped so as to be substantially free of selective absorption due to lattice vibration at particular frequencies in the infrared and far infrared regions. This property provides a result which is decidedly different from the manner in which other lattices react to the incident wave and exhibit strong absorption bands in the infrared region. The unexpected absence of such vibrational bands in pyrographite permit a thin foil composed of this substance to become useful as a polarizer of infrared and far infrared radiation together with numerous practical applications. Among such applications are optical systems such as spectrometers in the infrared and far infrared region and mode selectors and mode suppressors in the microwave region.

Furthermore, it has been determined that the particular absorption coefficient of pyrographite in the $c$ direction, which, as noted, is substantially smaller than the absorption coefficient in the $a$ direction over the entire frequency range from infrared to microwave frequencies, provides an additional freature which is particularly suited for use in spectrometers. This absorption coefficient in the *c* direction increases with an increase in frequency which provides an effective means to eliminate undesired visible radition. In infrared spectroscopy, attempts have been made to eliminate such undesired visible radiation by numerous devices, such as light-scattering plates and the like. However, these devices, which are an essential part of an infrared spectrometer, introduce transmission losses in the propagated wave as well as adding substantially to the complexity of the spectrometer. Accordingly, the use of a pyrographite infrared polarizer provides for polarization of the infrared, and, at the same time, provides an effective way to eliminate undesired radiation. Furthermore, light sources, generally used in infrared spectroscopy, have a greater intensity of radiation at the short end of the infrared spectrum. Thus, the use of a pyrographite polarizer provides that the energy distribution from the light source is equalized over substantially the entire infrared and far infrared region. This is particularly useful in spectrometers in which the output radiation is to be Fourier analyzed. In such devices, a thin foil of pyrographite can be inserted at any convenient position into a light beam of electromagnetic radiation without requiring additional components normally required to reshape the light beam, without utilizing extensive space, and without requiring that the incident light waves be aligned substantially parallel to the pyrographite foil.

Other and further advantages of this invention will be apparent as the description thereof progresses, reference being had to the accompanying drawings, in which.

Figure 1:
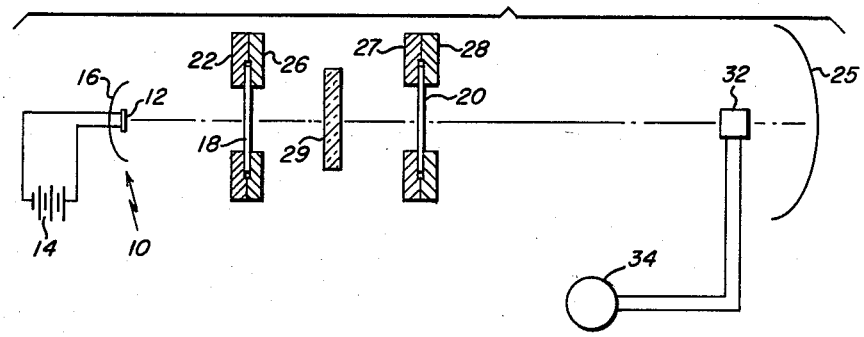
FIG. 1 is a schematic diagram of two pyrographite polarizers used in a polarization analyzing system embodying the present invention.
Figure 2:
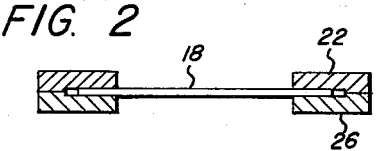
FIG. 2 is a cross-sectional view of the mounting rings for each pyrographite polarizer.
Figure 4:
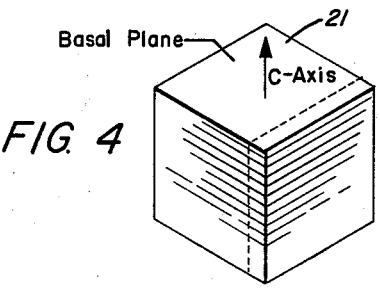
FIG. 4 is a pictorial view of a pyrographite block showing the cutting plane for obtaining the pyrographite foil.

Referring to FIG. 1, a suitable wave motion producing means for the pyrographic polarizer, such as a polychromatic light beam producing means 10, is provided. The light beam may be visible light, infrared light or any other suitable radiation source. The light or radiation producing beam, in the preferred embodiment, is a mercury arc light comprising a mercury arc 12 connected to a source of direct current 14. For directing the radiation, a suitable reflector is provided which, in the preferred embodiment, is a parabolic reflector 16 having the source of raditaion at the focal point thereof. The radiation is then directed in a parallel beam toward a pyrographite element or foil 18 which forms the polarizer portion of the analyzing system. This polarization foil provides polarized far infrared radiation, heretofore unobtainable. This permits the investigation of properties of materials which formerly could not be achieved. This foil 18 in connection with a second pyrographite foil 20 forms the analyzing system of the invention in which such materials can be analyzed. These foils 18 and 20 are mounted in a manner adapted for rotation by a mounting frame for each pyrographite foil, as shown in FIG. 2. To construct a pyrographite foil, a thin slice of pyrographite of approximately 20 mil thick is cut from a sample of pyrographite 21 of FIG. 4. The cut sample is then ground and polished by known methods of approximately .2 mil thick. The foil is oriented so that the *c* axis extends perpendicular to the incident beams from the radiation source 10.

Figure 3:
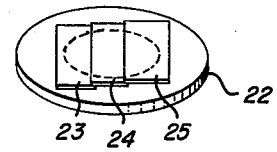
FIG. 3 is a pictorial view of the composite sections forming the pyrographite foil.

Referring to FIG. 2, mounting rings 22 and 26 are shown supporting the pyrographite foil. This foil may consist of as many layers of overlapping pyrographite elements as is required to cover the opening in the ring 22. In the present embodiment, FIG. 3 shows three overlapping pyrographite sections 23, 24 and 25 which are sandwiched between mounting ring 22 and mounting ring 26. These overlapping pyrographite sections present substantially a continuous pyrographite surface to the incident wave. In like manner, the analyzer foil 20 of FIG. 1 is supported by mouting rings 27 and 28. These rings and rings 22 and 26 are soldered together, cemented or connected by other well-known means to form a single supporting structure for the composite foil. When the incident beam of radiation to be polarized is sufficiently small, a single pyrographite section is sufficient to polarize the incident light beam.

Referring again to FIG. 1, the material to be analyzed 29 is positioned between the polarizer and analyzer foils. To measure the percentage of polarization introduced by such material, the foil 18 preferably is first oriented so that the *c* axis is substanitally perpendicular to the incident radiation. This can be determined in a known manner, such as by comparison with a foil of known polarization or by inspection. The foil can then be calibrated by marks, not shown, inscribed around its circumference. Before inserting the material under analysis into the radiation beam, the analyzer foil 20 is also aligned in the beam in the same direction with reference to its *c* axis. The material under investigation is then placed between the two foils and the analyzer foil rotated until maximum or minimum output of polarized radiation occurs. This output can be analyzed by means of a well-known spectrometer, not shown, and detected by suitable detecting means, such as a Golay cell 32 mounted at the focal point of a perabolic mirror 25. The Golay cell transforms the radiated polarized energy into a signal which is amplified in an amplifier, not shown, and can be indicated by a meter 34. For particular test purposes at millimeter and submillimeter wave lengths, the source of radiation 10 can be monochromatic. In this manner, radiation in the infrared ranges as well as at microwave frequencies can be analyzed by a single pair of pyrographite foils placed in the path of such radiation and, at the same time, undesired visible radition is suppressed by the intrinsic absorption properties of the pyrographite foil.

Figure 5A:
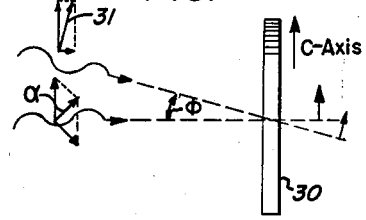
FIG. 5a is a schematic diagram showing electromagnetic waves directed at the pyrographite foil at perpendicular incidence and at an arbitrary incidence.

FIG. 5a shows the pyrographite foil positioned in the path of such radiation and further illustrates typical directions from which the radiation may approach the pyrographite foil without degrading the polarization operation of the foil. Therefore, the polarizing foil can be used in connection wtih large aperture optical systems, such as microscope systems, for investigation of small samples of material by means of polarized radiation. In such systems, focusing of the beam of radiation into a small area requires that light approach the sample from a wide range of angles, as shown in FIG. 5a. Presently known infrared polarizers are substantially inoperative over such wide ranges of incidence angles.

In FIG. 5a, the action of a polarizing foil 30 is shown for two incident beams, one perpendicular to the foil and the other beam directed at an angle $\phi$ with respect to the foil. To more readily explain the operation of the foil, assume the light beam perpendicular to the polarizing foil is polarized at an angle $\alpha$ in relation to the *c* axis shown in FIG. 5a. The electrical vector at angle $\alpha$ can be decomposed into two components, one which is parallel to the *c* axis of the pyrographite foil, the other which is perpendicular to the *c* axis and therefore lies in the basal plane of the pyrographite foil. As noted, since the absorption in the basal plane greatly exceeds the absorption in the c direction, only the component of radiation in the c direction is substantially transmitted. A similar analysis is indicated for a beam which approaches the foil at the angle $\phi$. In this instance, only the component in the plane of incidence is shown; the components of the electrical vector perpendicular to the plane of incidence being omitted since, as noted, these components lie parallel to the basal plane and are substantially absorbed. Electrical vector 31 is decomposed into orthogonal components in the $a$ and $c$ direction. However, only the component parallel to the $c$ axis is substantially transmitted. Thus, the polarized foil 30 is capable of polarizing light arriving over a wide range of angles.

Figure 5B:
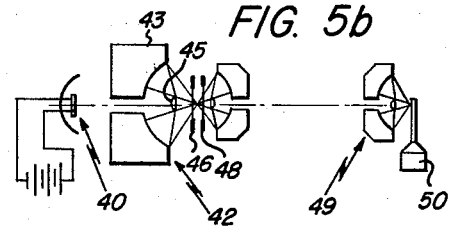
FIG. 5b is a schematic diagram of a high aperture optical device utilizing wide angle incident waves.

Referring in particular to FIG. 5b, there is shown a schematic diagram of a microscope system in which a wide angle beam of radiation from a source 40 is focused by an optical system 42 including mirors 43 and 45 into a small area for analysis of a small object, not shown, which is supported in the center of an objective ring, not shown, at the focal point of the beam. Polarization and analyzer foils 46 and 48, respectively, are positioned in the beam on either side of the objective ring, and, as shown, propagate polarized radiation over wide angles. In this manner, the object under observation can be analyzed and viewed by means of an optical system 49, concentrating the polarized beam onto a sensing device 50.

Figure 6:
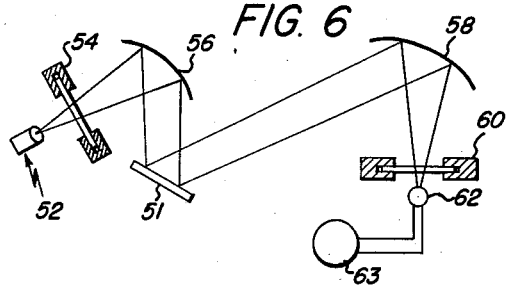
FIG. 6 is a schematic diagram of a pyrographite polarizer suited for analysis of nontransparent materials.

FIG. 6 is a schematic diagram of a polarization analyzing system adapted to be used with a material 51 which is nontransparent to radiation in the infrared and far infrared regions. Monochromatic light from a source 52 is directed through a polarization foil 54 which forms the polarizer portion of the analyzing system. A parabolic reflector 56 reflects the polarized beam from the material 51 to be analyzed and the reflected energy from said material undergoes a shift in polarization. The polarized light is reflected from a second reflector 58 through an analyzer foil 60 to a Golay cell 66 or to any suitable sensing device connected to an indicating meter 63. It should be understood that light source 52 may be either monochromatic or polychromatic. In a further application, the invention discloses the use of a polarization foil for polarizing far infrared radiation which is analyzed in a spectrometer.

Figure 7:
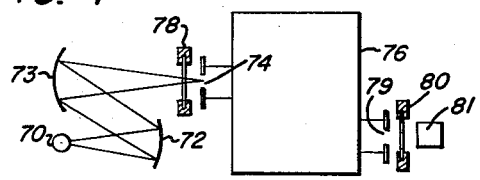
FIG. 7 is a schematic diagram of a spectrometer using a pyrographite polarizer.

FIG. 7 is a schematic diagram of a polarization system which can be used with a spectrometer. The radiation source 70, such as a mercury arc, is concentrated by a system of mirrors, such as mirrors 72 and 73, onto the entrance slit 74 of a spectrometer 76. Polarized light is produced by introducing the polarizing foil 78 either at the input section of the spectrometer, as shown, or at any other suitable position in the incident beam. In this manner, the spectrometer provides at its output slip 79 monochromatic radiation which is polarized, heretofore unobtainable in the far infrared region, and unobtainable over a wide range of frequencies in the infrared region. Alternately, monochromatic radiation can be polarized by a polarization foil 80 positioned in the path of radiation directed from the output section of the spectrometer to a detecting device 81. It is further possible to introduce the pyrographic polarizer foil in the beam at any convenient location within the spectrometer. This provides the advantage that no change in the optical system is required by the introduction of such foil. In addition, the percentage of polarized radiation provided by the polarization foil is in excess of any known polarizer in the infrared and far infrared region. For example, in particular types of well-known far infrared spectrometers, the continuous spectrum of a light source is modulated in a known manner and the Fourier analysis is performed wtih the detected data. In this instance, it is desirable to provide a light source which has a uniform intensity over the useful spectral range for the device. In the infrared and far infrared regions, presently available light sources exhibit a decrease of the intensity with decreasing frequency. The introduction of a pyrographite polarizer provides polarized light over this entire useful range. It also changes the energy distribution of incident radiation to act as a radiation equalizer, due to its absorption properties in the $c$ direction for the energy spectrum in the useful range. The importance of this equalization is seen in the fact that the Fourier components of analyzed data become of the same order of magnitude and the sensitive detector device generally used to obtain this data is not overloaded with the Fourier components of the region of high spectral energy.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:

1. A device for polarizing electromagnetic radiation from the radio frequency to and including the infrared region comprising a body of pyrographite positioned in the path of said radiation to provide polarization thereof.

2. A device for polarizing electromagnetic radiation from the radio frequency to and including the infrared region comprising a polarization element havingan anisotropy of absorption of electromagnetic radiation oriented so that the direction of minimum attenuation of the electrical field vector of said electromagnetic radiation in said element extends substantially perpendicular to the direction of propagation of said radiation.

3. A polarization device for electromagnetic radiation from the radio frequency to and including the infrared region comprising a polarization element of pyrographite oriented so that the direction of minimum attenuation of the electrical field vector of said electromagnetic radiation extends in said element in a direction generally perpendicular to the direction of propagation of said radiation.

4. A polarization device for electromagnetic radiation from the radio frequency to and including the infrared region comprising a polarization element of pyrographite in which any lattice vibration is substantially damped and oriented so that the normal direction of the basal plane in said element is substantially perpendicular to the propagation direction of said electromagnetic radiation.

5. A device for polarizing electromagnetic radiation from the radio frequency to and including the infrared region comprising a substance having an anisotropy of absorption for electromagnetic radiation in which the direction of minimum absorption extends in said substance generally perpendicular to the direction of propagation of electromagnetic radiation passing therethrough.

6. A polarization device for electromagnetic radiation from the radio frequency to and including the infrared region comprising a material having an anisotropy of absorption for electromagnetic radiation in which the direction of minimum absorption extends in such material substantially perpendicular to the direction of propagation of electromagnetic radiation passing therethrough, said material being substantially devoid of undamped lattice vibration in response to said radiation.

7. In combination, a source of electromagnetic radiation from the radio frequency to and including the infrared region, means for concentrating said radiation into a narrow beam, and means including material of pyrographite in which any lattice vibration is substantially damped positioned in said beam and oriented so that the normal direction of the basal plane in said material is generally perpendicular to the propagation direction of radiation passing therethrough.

8. In combination, an optical system for directing electromagnetic radiation from the radio frequncy to and including the infrared region, means for directing radiation into said optical system, and a pyrographite element cooperating with said optical system to change the energy distribution of radiation passing through said optical system.

9. A device for polarizing electromagnetic radiation from the radio frequency to and including the infrared region comprising a substance in which any lattice vibration is substantially damped and having an anisotropy of absorption for electromagnetic radiation in which the direction of minimum absorption extends in such substance substantially perpendicular to the direction of propagation of electromagnetic radiation passing therethrough.

10. A device for polarizing electromagnetic radiation over a wide range of frequencies from the radio frequency to and including the infrared region comprising an element including pyrographite positioned in the path of said radiation, said pyrolitically formed graphite having an anisotropy of optical absorption.

11. A polarization device for polarizing electromagnetic radiation from the radio frequnecy to and including the infrared region comprising a polarization foil of pyrographite oriented in said path of radiation so that the direction of minimum attenuation for the electrical field vector of said radiation extends in said foil generally perpendicular to the path of said radiation, said pyrolitically formed graphite being substantially free of lattice vibration causing absorption bands in said graphite.

12. A polarization device for polarizing electromagnetic radiation from the radio frequency to and including the infrared region comprising a polarization foil of pyrographite oriented in said path of radiation so that the direction of minimum attenuation for the electrical field vector of said radiation extends in said foil generally perpendicular to the path of said radiation, said foil being sufficiently thin in the direction of the path of said radiation to permit propagation of a substantial magnitude of said radiation.

13. In combination, a source of electromagnetic radiation from the radio frequency to and including the infrared region, a device for separating frequencies of electromagnetic energy into individual frequency bands, means for directing said radiation to said device, and pyrographite means positioned in the path of said radiation to provide polarized monochromatic radiation.

14. In combination, a device for separation of frequencies of electromagnetic radiation into individual frequency bands, a source of far infrared electromagnetic radiation, means for directing said far infrared radiation to said device, and a pyrographite element positioned in the path of said radiation to provide polarized monochromatic light in the far infrared region.

15. In combination, an optical system for changing the beam width of electromagnetic radiation from the radio frequency to and including the infrared region, means for directing electromagnetic radiation into said system, and an element of pyrographite positioned in the path of said radiation passing through said system to provide polarized radiation.

16. In combination, a source of electromagnetic radiation in the far infrared region, means for converting said far infrared radiation to monochromatic radiation, and means for polarizing said monochromatic radiation, said polarizing means including an element of pyrographite oriented in the path of said monochromatic radiation so that the direction generally normal to the basal plane in said element is substantially perpendicular to the propagation direction of said radiation.

17. In combination, a source of electromagnetic radiation from the radio frequency to and including the infrared region, means for concentrating said radiation over a wide angle into a small area beam of radiation, and pyrographite means positioned in said beam and adapted to polarize said beam of radiation directed thereon.

18. A device for producing polarized far infrared radiation comprising a source of far infrared radiation, and a polarization foil of pyrographite positioned in the path of said radiation.

References Cited in the file of this patent
UNITED STATES PATENTS

| | | |
|---|---|---|
| 2,347,582 | Ulffers | Apr. 25, 1944 |
| 2,494,686 | Blake | Jan. 17, 1950 |
| 2,679,010 | Luft | May 18, 1954 |
| 2,964,635 | Harrick | Dec. 13, 1960 |